(12) United States Patent  
Pei

(10) Patent No.: US 8,860,869 B2  
(45) Date of Patent: Oct. 14, 2014

(54) LENS WITH SAPPHIRE SUBSTRATE AND LENS MODULE

(71) Applicant: Shao-Kai Pei, New Taipei (TW)

(72) Inventor: Shao-Kai Pei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/662,581

(22) Filed: Oct. 29, 2012

(65) Prior Publication Data  
US 2013/0335625 A1  Dec. 19, 2013

(30) Foreign Application Priority Data  
Jun. 15, 2012  (TW) .................................. 101121458

(51) Int. Cl.  
*H04N 5/225* (2006.01)  
*G02B 1/10* (2006.01)

(52) U.S. Cl.  
USPC ............ 348/342; 348/374; 359/581; 359/582

(58) Field of Classification Search  
USPC ........................ 348/335, 340, 342, 373, 374; 359/355–356, 359, 722–723, 580, 581, 359/582, 586, 587  
See application file for complete search history.

(56) References Cited

U.S. PATENT DOCUMENTS

| | | | |
|---|---|---|---|
| 2011/0310472 A1* | 12/2011 | Hirai et al. ..................... | 359/359 |
| 2012/0243077 A1* | 9/2012 | Osawa et al. ................... | 359/356 |
| 2013/0141771 A1* | 6/2013 | Pei ................. | 359/275 |
| 2013/0155495 A1* | 6/2013 | Wang ............. | 359/356 |
| 2013/0258455 A1* | 10/2013 | Pei ................. | 359/355 |
| 2013/0286470 A1* | 10/2013 | Chien et al. ................... | 359/359 |
| 2013/0293950 A1* | 11/2013 | Wei ................ | 359/355 |
| 2013/0314772 A1* | 11/2013 | Chen et al. .................... | 359/355 |
| 2014/0043677 A1* | 2/2014 | Chen et al. .................... | 359/356 |

* cited by examiner

*Primary Examiner* — Daniel M Pasiewicz  
(74) *Attorney, Agent, or Firm* — Novak Druce Connolly Bove + Quigg LLP

(57) ABSTRACT

A lens includes a substrate and an infrared-cut (IR-cut) filtering film. The substrate is made of sapphire, is configured for converging or diffusing light rays and includes an object-side surface and an image-side surface opposite to the object-side surface. The IR-cut filtering film increases the reflectivity of the substrate in relation to infrared light, and is coated on the image-side surface of the substrate.

9 Claims, 2 Drawing Sheets

LENS WITH SAPPHIRE SUBSTRATE AND LENS MODULE

BACKGROUND

1. Technical Field

The present disclosure relates to lenses, and particularly to a lens with sapphire substrate and a lens module including the lens.

2. Description of Related Art

Lenses are typically made of glass or plastic. However, the hardness, strength, and weather resistance of the lenses are often less than satisfactory. As such, cameras employing the lenses cannot be used in hostile environment conditions.

Therefore, it is desirable to provide a lens and a lens module, which can overcome the limitations described.

DETAILED DESCRIPTION

Embodiments of the disclosure will be described with reference to the drawings.

Figure 1:
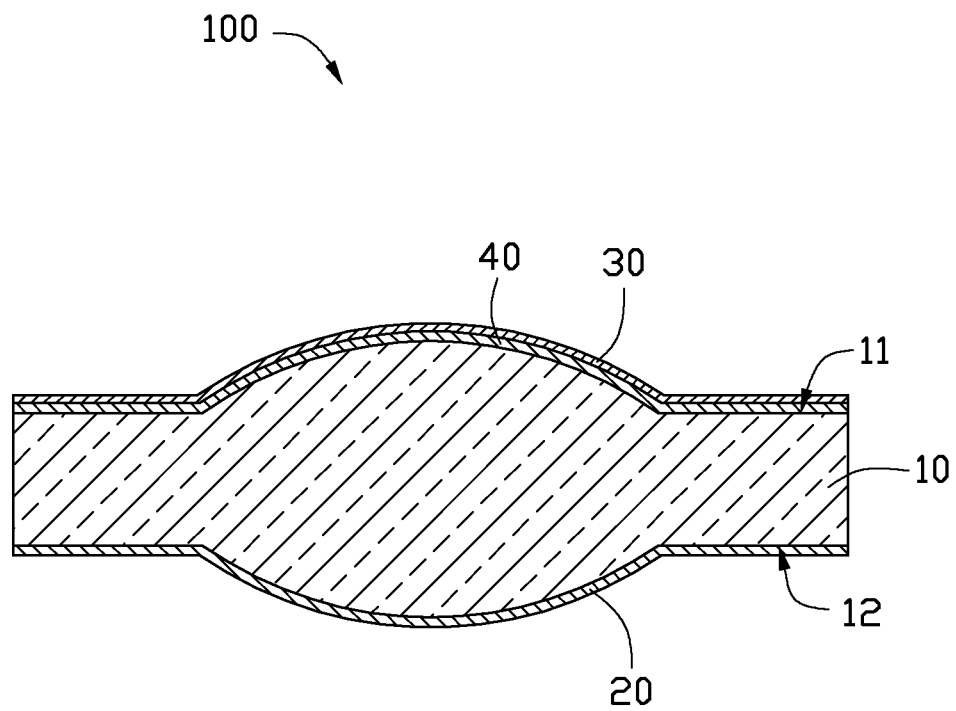
FIG. 1 is a cross-sectional schematic view of a lens in accordance with an exemplary embodiment.

Referring to FIG. 1, a lens 100, according to an exemplary embodiment is shown. The lens 100 includes a substrate 10, an infrared-cut (IR-cut) filtering film 20, and a waterproofing film 30.

The substrate 10 is made of sapphire. Sapphire is a gemstone variety of the mineral corundum, and has a hexagonal crystal structure. The main chemical component of sapphire is aluminum oxide, and the refractive index of the sapphire is from about 1.757 to about 1.760. The growth direction of the sapphire is a-axis ($11\bar{2}0$), c-axis (0001), m-axis ($10\bar{1}0$). A transmissivity of the substrate 10 at infrared wavelengths, of about 825 nm to about 1300 nm, is greater than 85%.

The substrate 10 has positive refraction power or negative refraction power. The substrate 10 includes an object-side surface 11 and an image-side surface 12 opposite to the object-side surface 11. The curvature of at least one of the object-side surface 11 and the image-side surface 12 is not zero. Light rays projected on the substrate 10 are converged or diffused after penetrating the substrate 10.

In the embodiment, the process of molding the substrate 10 includes steps: melting the shattered sapphire particles under 900° C.-1300° C.; molding the sapphire particles with bead shaped; molding the substrate 10 with the sapphire particles by a mold (not shown).

The IR-cut filtering film 20 increases the reflectivity of the substrate 10 at infrared wavelengths, and is coated on the image-side surface 12 of the substrate 10 by a sputter method or an evaporation method. The IR-cut filtering film 20 includes a first layer to a fifty fourth layer stacked on the substrate 10. The odd number layers have low refraction index, and the even number layers have high refraction index. In the embodiment, the material of the odd layers is titanium dioxide ($TiO_2$), and the material of the even layers is silicon dioxide ($SiO_2$).

In the embodiment, the IR-cut filtering film 20 is designed according to the spectrum characteristic curve of the substrate 10. The IR-cut filtering film 20 can be designed to filter one or more specific wavelength.

The waterproofing film 30 capable of proofing oil and water, and is coated on the object-side surface 11 of the substrate 10 by a sputter method or an evaporation method. The main material of the waterproofing film 30 is $SiO_2$.

In order to increase transmissivity of the substrate 10 at visual light, an antireflection film 40 is coated between the waterproofing film 30 and the object-side surface 11. The antireflection film 40 is configured to decrease the reflectivity of the substrate 10 within the visible light spectrum and increase the transmissivity of the substrate 10. The antireflection film 40 includes a number of layers staked on the object-side surface 11.

The hardness of the lens 100 is about 1500 $Kg/mm^2$ to about 2000 $Kg/mm^2$, yield strength of the lens 100 is about 300 MPa to about 400 MPa, compressive strength of the touch panel 100 is about 2 GPa, temperature range is from about −40° C. to about 2000° C. The lens 100 can bear high voltage and high frequency. The reflectivity of the lens 100 at infrared wavelengths range is greater than 99%, and the transmissivity of the lens 100 at visual wavelengths range is from about 90% to about 99.5%.

Figure 2:
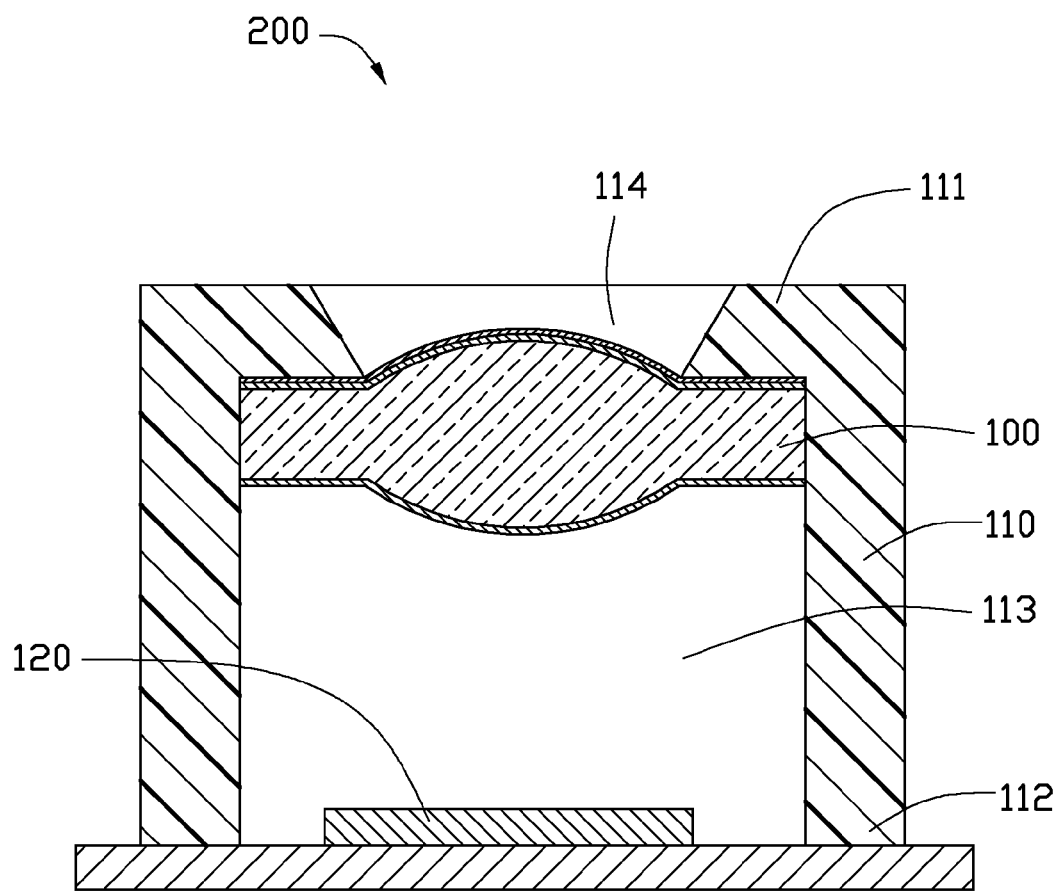
FIG. 2 is a cross-sectional schematic view of a lens module using the lens of FIG. 1.

Referring to FIG. 2, a lens module 200, according to an exemplary embodiment, includes the lens 100, a lens barrel 110, and an image sensor 120. The lens barrel 110 includes an object side 111 and an image side 112 opposite to the object side 111. A receiving room 113 is formed between the object side and the image side 112. The lens barrel 110 defines a light entering hole 114 communicating with the receiving room 113 and positioned on the object side 111. The lens 100 is received in the receiving room 113, and seals the light entering hole 114. The image sensor 120 is positioned on the image side 112 of the lens barrel 110. The light rays entering the light entering hole 114 penetrate the lens 100 and then project on the image sensor 120. The image sensor 120 converts the light rays to electrical signals.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens, comprising:
   a substrate made of sapphire, the substrate comprising an object-side surface and an image-side surface opposite to the object-side surface;
   a waterproofing film coated on the object-side surface of the substrate;
   an anti-reflection film coated between the waterproofing film and the object-side surface; and
   an infrared-cut (IR-cut) filtering film configured for increasing the reflectivity of the substrate at infrared wavelengths, the IR-cut filtering film coated on the image-side surface of the substrate.

2. The lens of claim 1, wherein the lens has positive refraction power or negative refraction power.

3. The lens of claim 1, wherein the IR-cut filtering film comprises a first layer to a fifty fourth layer stacked on the substrate; the odd number layers have low refraction index, and the even number layers have high refraction index.

4. The lens of claim 3, wherein the material of the odd layers is titanium dioxide, and the material of the even layers is silicon dioxide.

5. The lens of claim 1, wherein the main material of the waterproofing film is silicon dioxide.

6. A lens module, comprising:
a lens barrel; and
a lens received in the lens barrel, comprising:
- a substrate made of sapphire, the substrate comprising an object-side surface and an image-side surface opposite to the object-side surface;
- a waterproofing film coated on the object-side surface of the substrate;
- an anti-reflection film coated between the waterproofing film and the object-side surface; and
- an IR-cut filtering film configured for increasing the reflectivity of the substrate at infrared wavelengths, the infrared-cut (IR-cut) filtering film coated on the image-side surface of the substrate.

7. The lens module of claim 6, wherein the IR-cut filtering film comprises a first layer to a fifty fourth layer stacked on the substrate; the odd number layers have low refraction index, and the even number layers have high refraction index.

8. The lens module of claim 7, wherein the material of the odd layers is titanium dioxide, and the material of the even layers is silicon dioxide.

9. The lens module of claim 6, comprising an image sensor, the image sensor received in the lens barrel and aligned with the lens.

\* \* \* \* \*